United States Patent [19]

Smith et al.

[11] 4,083,575
[45] Apr. 11, 1978

[54] VEHICLE SUSPENSION SYSTEM

[76] Inventors: Richard W. Smith, 15602 Briarbank, La Puente, Calif. 91744; David S. Nakai, 13791 Stampede Cir., Irvine, Calif. 92905

[21] Appl. No.: 580,057

[22] Filed: May 22, 1975

[51] Int. Cl.² ............................................. B60G 3/00
[52] U.S. Cl. ................................. 280/696; 267/20 A
[58] Field of Search .......... 280/124 R, 124 A, 112 R, 280/112 A; 267/20 R, 20 A; 180/73 TL

[56] References Cited

U.S. PATENT DOCUMENTS

| | | | |
|---|---|---|---|
| 2,078,932 | 5/1937 | Christman | 267/20 A |
| 2,123,305 | 7/1938 | Hierta | 267/20 A |

*Primary Examiner*—Philip Goodman
*Attorney, Agent, or Firm*—Lindenberg, Freilich, Wasserman, Rosen & Fernandez

[57] ABSTRACT

A kit for altering the front suspension of an automobile or other vehicle which has a pair of independent front axles, to provide greater clearance for traversing rough terrain normally requiring the use of four-wheel drive vehicles that cost more and have lower fuel mileage. The kit includes a pair of auxiliary axle mounting blocks for holding the inner ends of the front axles at positions spaced directly below the original mounting points thereof on the vehicle frame, and a pair of curved longer replacement radius arms with inner and outer ends for mounting in the same locations and orientations as the inner and outer ends of the original radius arms respectively on the frame and now-lowered front axles.

3 Claims, 5 Drawing Figures

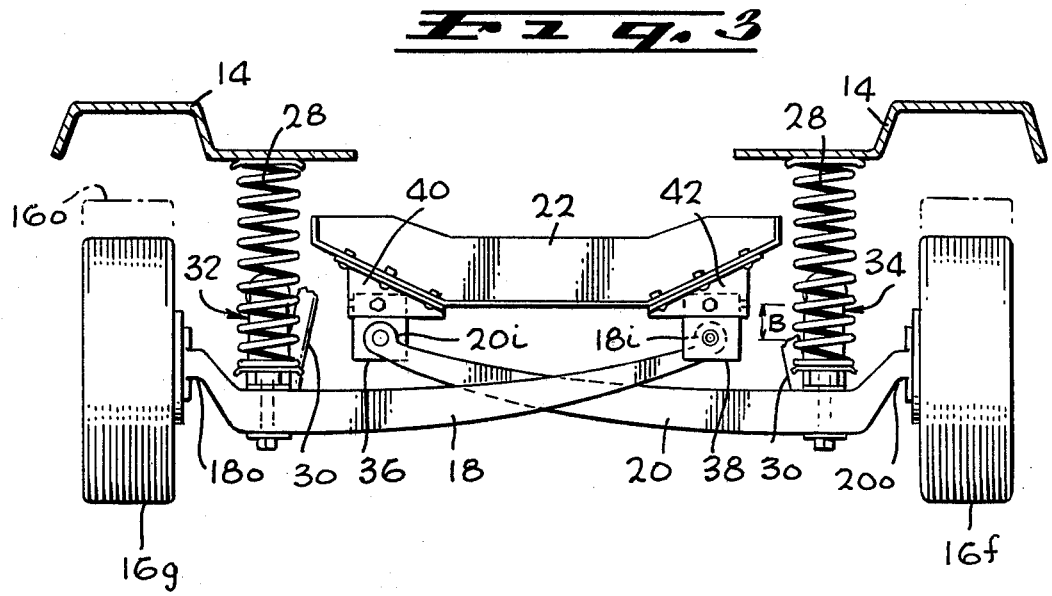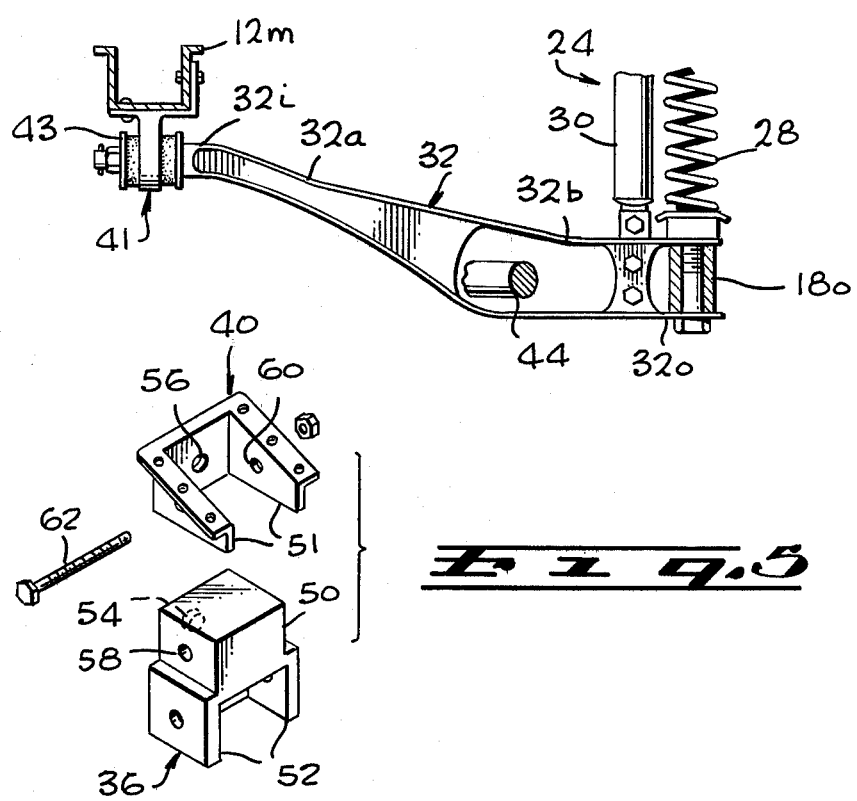

VEHICLE SUSPENSION SYSTEM

BACKGROUND OF THE INVENTION

This invention relates to vehicles and to conversion apparatus and methods for changing the front suspension of a vehicle.

It is often necessary to utilize a vehicle that can traverse difficult terrain, as well as operate well on roads. Fourwheel drive vehicles are often employed, but they weigh and cost much more than comparable two-wheel drive vehicles, provide considerably poorer mileage in both off-road and on-road travel, and provide poor shock absorption due tho their rigid single front axle. When it is desired to adapt the front end of a two-wheel drive vehicle for difficult terrain, one procedure is to cut-away the body around the front wheel well or to remount the body several inches higher on the frame, so that larger, high floatation tires can be mounted on the front axles. However, the frame itself limits the wheel size, turning radius, and clearance. A longer spring and shock absorber can be used to increase the height of the frame above the wheels, but this produces negative camber that wears the outside of the tires during on-road travel, and also produces negative caster. The negative camber can be corrected by considerably re-bending the front axles, but this results in less sideward tire clearance and weakens the axle. A simple conversion kit that could be easily installed, without requiring drastic rebending of axles or other vehicle parts, and which provided large ground clearance, large tire height clearance, large tire width clearance, and large axle travel, would be of considerable value.

SUMMARY OF THE INVENTION

In accordance with one embodiment of the present invention, a kit is provided for easily converting the front portion of a vehicle to traverse difficult terrain. The kit includes parts for raising the front end of the frame higher above the wheels, without altering the alignment characteristics of the front wheels or the mounting characteristics of the radius arms. A pair of auxiliary axle mounting blocks support the inner ends of the independent front axles several inches lower below the frame then originally, so that the original front axles can be used either without bending them or without bending them more than a small amount, and without reducing tire width clearance. A pair of replacement radius arms is provided, each having a curved wide middle portion to permit the opposite ends of the arms to be mounted on the frame and front axles at the same orientation as the original arms while extending down to the lowered outer axle ends.

The novel features of the invention are set forth with particularity in the appended claims. The invention will best be understood from the following description when read in conjunction with the accompanying drawings.

BRIEF DESCRIPTION OF THE DRAWINGS

FIG. 3 is a front elevation view of the suspension of FIG. 2;

FIG. 4 is a side elevation view of the suspension of FIG. 2; and

FIG. 5 is a perspective view showing how one of the auxiliary axle mounting blocks is attached to the vehicle.

DESCRIPTION OF THE PREFERRED EMBODIMENTS

Figure 1:
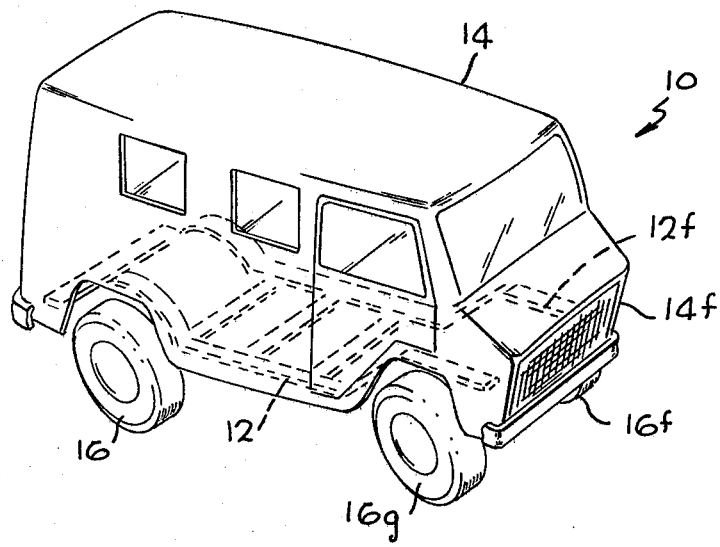
FIG. 1 is a perspective view of a vehicle constructed in accordance with the present invention.

FIG. 1 illustrates a van-type vehicle 10 which is often utilized for camping in remote areas, and which has been modified by the conversion kit of the present invention so that the frame 12 as well as the body 14 which is mounted on the frame, lie at a greater height above the wheels 16 of the vehicle, and particularly with the front ends 12f, 14f of the frame and body raised to lie at a greater height above the front wheels 16f, 16g.

Figure 2:
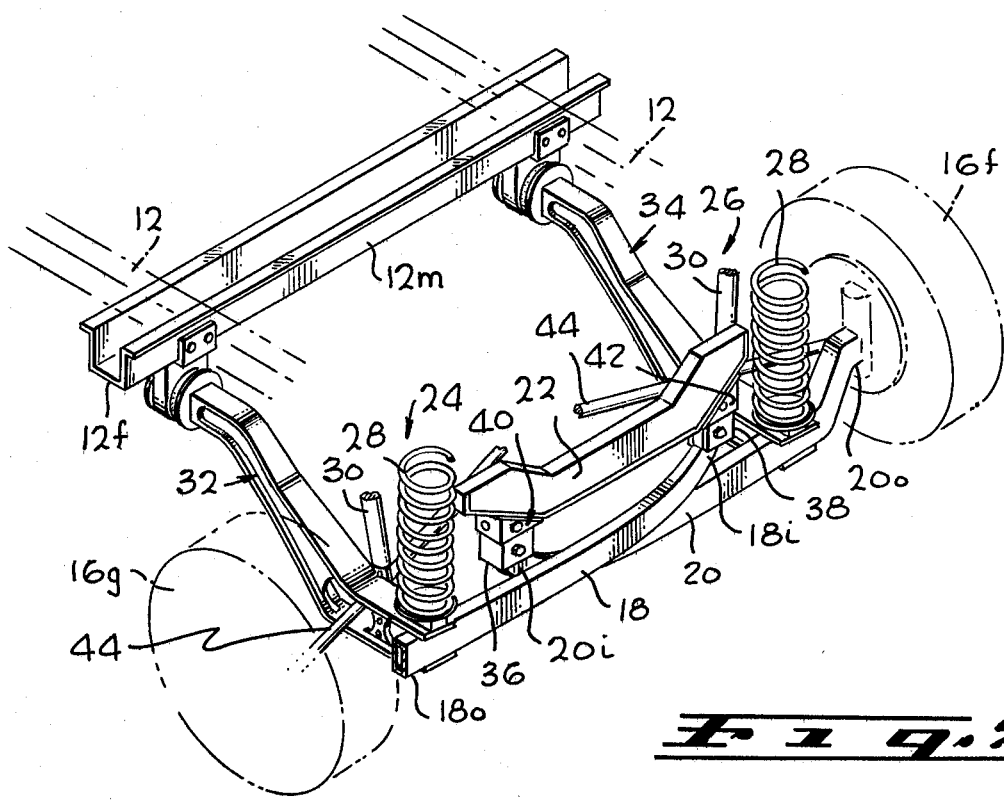
FIG. 2 is a perspective partial view of the vehicle of FIG. 1, showing the front wheel suspension portion thereof.

FIG. 2 illustrates the front wheel suspension in greater detail, which includes a pair of independent front axles 18, 20 with outer end portions 18o, 20o mounted on the front wheels and inner end 18i, 20i pivotally mounted on blocks that are fixed to an engine cross member 22 of the frame, that supports the engine. A pair of shock assemblies 24, 26, each including a spring 28 and a shock absorber 30, resiliently support the outer portions 18o, 20o of the axles on the frame to permit up and down movement of the wheels. A pair of radius arms 32, 34 extend largely longitudinally from a frame member 12 to the outer portions of the axles 18, 20 at the locations where they attach to the springs, to prevent rearward movement of the wheels with respect to the frame, while allowing up and down movement of the wheels.

As also illustrated in FIGS. 3 and 4, the front suspension includes a pair of auxiliary axle mounting blocks 36, 38 that pivotally support the inner ends of the axles. The auxiliary mounting blocks are mounted on original mounting blocks 40, 42 that are fixed to the engine cross member 22 and that are supplied as original equipment on the vehicle. The particular mounting blocks 36, 38 of one embodiment of the invention provides a mounting point spaced a distance B of three inches below the original mounting point of the axle inner ends. The axles 18, 20 can be left in their originally bent configuration, in which case replacement springs 28 and replacement shock absorbers 30 of three inches greater height may be utilized, or spring mounting blocks of about three inches height and shock absorber brackets of three inches greater length may be utilized so that the original springs and shock absorbers can be used.

The auxiliary axle mounting blocks such as block 36 shown in FIG. 5, is a cast member with a solid upper part 50 that fits into the original mounting block 40 closely between side walls 51 of the original block that are spaced apart by the width of the inner axle end. The auxiliary block also has a pair of depending side walls 52 that closely receive the inner end of a front axle. The auxiliary block 36 is mounted by laying it within the original block 40, with a boss 54 on the auxiliary block received in a hole 56 present in the original block, and with a mount hole 58 of the auxiliary block aligned with axle-support holes 60 of the original block. A bolt 62 is then projected through the holes 58, 60 of the blocks and a nut is threaded onto the bolt.

The curved replacement radius arms 32, 34 are substituted for the original straight radius arms of the vehicle. The replacement radius arms (FIG. 4) such as 32, each have an inner end 32i mounted on a dampening bracket 41 with rubber dampening rings 43, the bracket 40 being mounted on the cross member 12m of the vehicle frame. The outer end 32o of the radius arm mounts on the axle 18 and also supports the spring 28 and shock absorber 30. The replacement radius arm is bent at 32a and 32b along its middle, so that its ends can mount on the same bracket 41 and the same portion of the axle 18 as the original radius arm, even though the outer end of the axle 18 has been lowered. The radius arm 32 is not only bent or curved, but is also of somewhat greater length than the original radius arm which it replaces, to account for the greater distance to the lowered outer axle end. For radius arms which are originally about 28 inches long, and where the axles are to be bent so their lower ends are lowered by five inches, the new radius arms such as 32 are made about 31 inches long, the increased length being at the regions of the two bends 32a, 32b. It is highly desirable that the rear end 32i of the radius arm is mounted in the original location, instead of utilizing blocks to lower the location so that the original radius arms can be used. This is because the radius arms must withstand large rearward shocks as the front wheels hit obstacles, so that lower mounting of the inner ends of the arms could cause twisting of the frame due to the larger torque thereby produced on the frame.

The conversion kit includes replacement radius arms 32, 34, replacement springs 28, replacement shock absorbers 30, and replacement pivot axle blocks 36, 38. All of these items can be readily installed on a vehicle either by an owner or by a hired mechanic at relatively low cost. The tie rods 44 which connect to the front wheels, must be lengthened, but since provisions for lengthening them are already present in vehicles for aligning the wheels, no additional parts must be provided for the tie rods. Where somewhat greater clearance is desired, and the customer will accept the extra effort or the cost of a mechanic's time in rebending the front axles 18, 20, the axles may be bent to lower their outer ends by an additional small amount such as two inches (to lower the wheels a total of five inches below the original wheel location 16o), and a different kit is provided which has slightly longer springs and radius arms, but with the same auxiliary axle mounting blocks. It may be noted that the rear end of the vehicle frame, whose wheels are not steered, can be lowered by providing a pair of axle spacer blocks to raise the rear frame end off the rear axle bearings, and two pairs of U-bolts to hold the spacer blocks on the frame. It also may be noted that the customer normally will replace the tires of the vehicle with high floatation tires in order to obtain the maximum advantage of the vehicle conversion.

The conversion kit of the present invention, by raising the front of the vehicle frame and body off the wheels, provides considerably greater clearances than could be provided merely by raising only the body off the frame or cutting away the body portion around the wheels to permit larger wheels to be utilized. The greater height of the frame provides greater ground clearance for traversing large obstacles such as logs or bumps in the terrain. Normally, both wheels will move over such an obstacle, and when the middle portion of the frame reaches the obstacle the frame or transmission housing could contact the obstacle unless it were raised higher above the wheels. The greater height of the frame also provides greater vertical axle travel when suddenly hitting an obstacle, and also provides for a smaller turning radius since the frame is not in the way of the turning tire. The converted vehicle is often able to traverse terrain better than a four-wheel drive vehicle, inasmuch as it can move faster over obstacles, due to the independent front suspension, than can a four-wheel drive vehicle which has a solid front axle. Modern large floatation tires with improved rubber composition, body construction, and tread design, provide much higher traction than was formerly possible, so that the driving of the front wheels of a vehicle is not as important as formerly. The lower weight and cost and much better mileage of the converted vehicle of the invention as compared to a four-wheel drive which is often the only alternative for difficult terrain, results in considerable savings for the vehicle user.

Thus, the invention provides a method and apparatus for converting a two-wheel drive vehicle for traversing difficult terrain, by providing a simple and easily installed conversion kit that raises the front of the vehicle frame off the wheels. The raising of the frame is accomplished by utilizing the original front axles, but mounting them lower by the use of auxiliary mounting blocks, and by utilizing a modified curved and slightly lengthened radius arm so that its ends have the same horizontal orientation as the original radius arms even though the axles are lowered with respect to the frame.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A conversion kit for a vehicle which has a frame, a body mounted on the frame, a pair of front wheels, a pair of independent elongated front axles each having an outer portion connected to a front wheel and supporting the frame through an original coil spring and having an inner end pivotally mounted on an original axle block fixed to the rest of said frame, and a pair of original radius arms each having an outer end coupled to an outer portion of a front axle and an inner end mounted on said frame, comprising:

a pair of auxiliary axle blocks mountable on said frame to lie below the original axle blocks, to hold the inner ends of the front axles further below the vehicle frame than they are held by the original axle blocks;

a pair of replacement coil springs, each of greater height than said original coil springs, to support the outer ends of the front axles further below the vehicle frame than they are held by the original springs; and a pair of replacement radius arms, each of longer length than said original radius arms, each having inner and outer ends respectively formed to mount in place of the corresponding ends of the original radius arms, and each having a bent middle portion which leaves the outer ends at substantially parallel orientations, to brace the outer portions of the front axles while they lie at a lower level below the vehicle frame.

2. The conversion kit described in claim 1 wherein:

the original mounting blocks (40, 42) each have a pair of side walls (51), and said auxiliary axle blocks each include an upper part (50) of approximately the same width as the space between said original block side walls and with a hole (58) alignable with holes (60) of the original block to receive a bolt through them, and also include a pair of depending auxiliary side walls (52) for pivotally supporting the inner end of an axle.

3. A method for converting a vehicle having driven rear wheels and undriven front wheels, a frame which has a pair of original front axle blocks, a body mounted on said frame, a pair of independent front axles having inner ends pivotally mounted on the axle blocks at predetermined original pivot joints and having outer ends coupled to said wheels, a pair of radius arms having inner ends pivotally mounted at predetermined location on said frame which lie behind outer portions of said front axles and having outer ends fixed to the outer portions of said front axles, and a pair of spring and shock absorber assemblies for supporting the front of the frame at a predetermined original height above the outer portion of the front axles, comprising:

detaching the inner ends of the front axles from the frame and reattaching them in pivot joints at locations spaced a predetermined distance directly below the original pivot joints; and detaching the inner and outer ends of the radius arms respectively from the frame and front axle outer portions, and attaching the inner and outer ends of replacement radius arms which are of greater length and curvature than the original arms at the same locations on the frame and axles as the inner and outer ends of the original radius arms.

* * * * *